United States Patent
Kump et al.

(10) Patent No.: US 6,633,657 B1
(45) Date of Patent: Oct. 14, 2003

(54) METHOD AND APPARATUS FOR CONTROLLING A DYNAMIC RANGE OF A DIGITAL DIAGNOSTIC IMAGE

(75) Inventors: Kenneth Scott Kump, Waukesha, WI (US); Ping Xue, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/354,111

(22) Filed: Jul. 15, 1999

(51) Int. Cl.$^7$ .................................................. G06K 9/00
(52) U.S. Cl. .................. 382/128; 358/519; 358/520; 382/162; 382/274; 600/443; 600/458
(58) Field of Search .................................. 382/128–132, 382/162, 169, 274, 284; 358/519–520; 600/448, 458

(56) References Cited

U.S. PATENT DOCUMENTS

| | | | |
|---|---|---|---|
| 4,315,318 A | 2/1982 | Kato et al. | |
| 4,674,125 A | 6/1987 | Carlson et al. | |
| 4,716,414 A | 12/1987 | Luttrell et al. | |
| 4,718,104 A | 1/1988 | Anderson | |
| 4,943,707 A | 7/1990 | Boggan | |
| 4,969,204 A | 11/1990 | Melnychuck et al. | |
| 5,012,333 A | * 4/1991 | Lee et al. | 358/520 |
| 5,151,947 A | * 9/1992 | Nagatsuka et al. | 382/132 |
| 5,450,216 A | * 9/1995 | Kasson | 358/518 |
| 5,461,655 A | 10/1995 | Vuylsteke et al. | |
| 5,467,404 A | 11/1995 | Vuylsteke et al. | |
| 5,488,674 A | * 1/1996 | Burt et al. | 382/284 |
| 5,493,622 A | * 2/1996 | Tsuchino et al. | 382/132 |
| 5,546,473 A | 8/1996 | Buytaert et al. | |
| 5,616,930 A | 4/1997 | Janssens et al. | |
| 5,644,662 A | 7/1997 | Vuylsteke | |
| 5,652,776 A | 7/1997 | Riet | |
| 5,717,791 A | 2/1998 | Labaere et al. | |
| 5,818,975 A | * 10/1998 | Goodwin et al. | 382/274 |
| 5,828,793 A | * 10/1998 | Mann | 382/284 |
| 5,832,055 A | 11/1998 | Dewaele | |
| 5,835,618 A | * 11/1998 | Fang et al. | 382/132 |
| 5,848,198 A | * 12/1998 | Penn | 382/276 |
| 5,883,985 A | * 3/1999 | Pourjavid | 382/274 |
| 5,923,775 A | * 7/1999 | Snyder et al. | 382/172 |
| 5,978,518 A | * 11/1999 | Oliyide et al. | 382/260 |
| 6,058,217 A | * 5/2000 | Kondo | 382/251 |

(List continued on next page.)

OTHER PUBLICATIONS

"The Expanding Role of Medical Physics in Diagnostic Imaging", Frey et al., Proceedings of the 1997 AAPM Summer School.

(List continued on next page.)

Primary Examiner—Bhavesh M. Mehta
Assistant Examiner—Gregory Desire
(74) Attorney, Agent, or Firm—McAndrews, Held & Malloy, Ltd.; Peter J. Vogel; Michael A. Dellapenna

(57) ABSTRACT

A method and system for controlling a dynamic range of a medical diagnostic image provided by a medical diagnostic system. A target dynamic range is identified independent of a dynamic range of an original medical image. A presentation map is generated defining a relation between the dynamic range of the original medical image representative of a patient and the target dynamic range. A gray level-optical density model may define the relation between gray levels of the original medical image and target optical densities of the presentation map, the gray level-optical density model being calculated based on film characteristics, selected optical densities for anatomical structure or on a measured dynamic range. A presentation image is created having the target dynamic range based on a the presentation map and original medical image.

26 Claims, 9 Drawing Sheets

U.S. PATENT DOCUMENTS

| | | | | |
|---|---|---|---|---|
| 6,163,621 A | * | 12/2000 | Paik et al. | 382/169 |
| 6,204,881 B1 | * | 3/2001 | Ikeda et al. | 348/362 |
| 6,233,069 B1 | * | 5/2001 | Buhr et al. | 358/519 |
| 6,282,312 B1 | * | 8/2001 | McCarthy et al. | 382/162 |
| 6,282,313 B1 | * | 8/2001 | McCarthy et al. | 382/162 |
| 6,285,784 B1 | * | 9/2001 | Spaulding et al. | 382/162 |
| 6,285,798 B1 | * | 9/2001 | Lee | 382/260 |
| 6,314,198 B1 | * | 11/2001 | Ogura | 382/132 |
| 6,335,983 B1 | * | 1/2002 | McCarthy et al. | 382/162 |
| 6,434,262 B2 | * | 8/2002 | Wang | 382/132 |

OTHER PUBLICATIONS

"Histogram–Directed Processing of Digital Chest Images", McAdams et al., Investigative Radiology, Mar. 1986, vol. 21.

"A Fully Automated Algorithm for the Segmentation of Lung Fields on Digital Chest Radiographic Images", Duryea et al., Medical Physics, vol. 22, No. 2, Feb. 1995.

"Logistic representation of the sensitometric response of sceen–film systems: Empirical validation", Willis et al., Med. Phys. 17 (4), Jul./Aug. 1990.

* cited by examiner

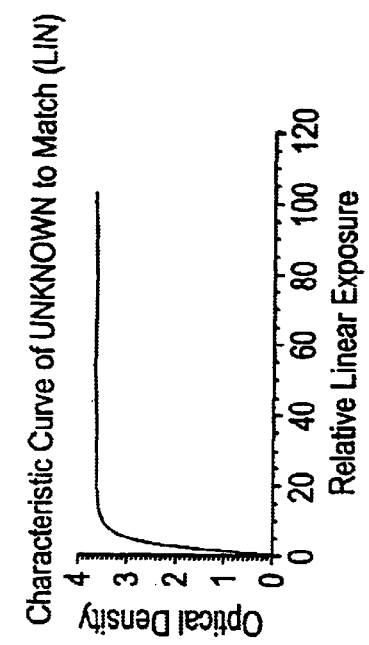
FIG. 8A
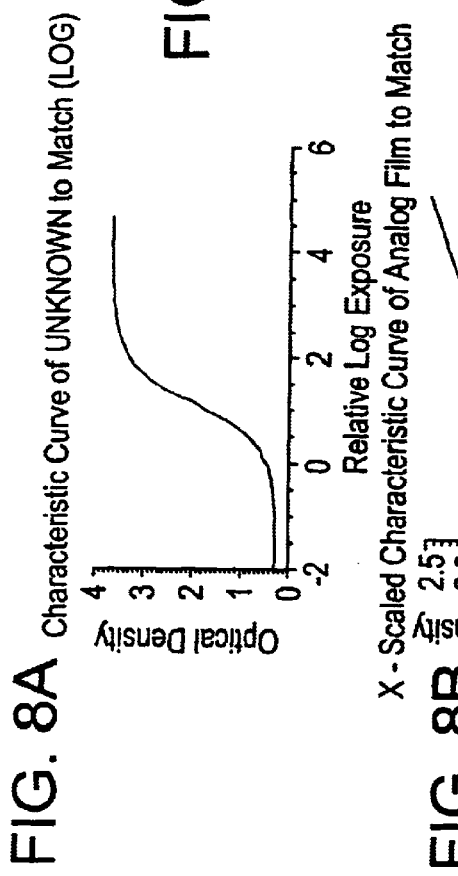
FIG. 8B
FIG. 8C
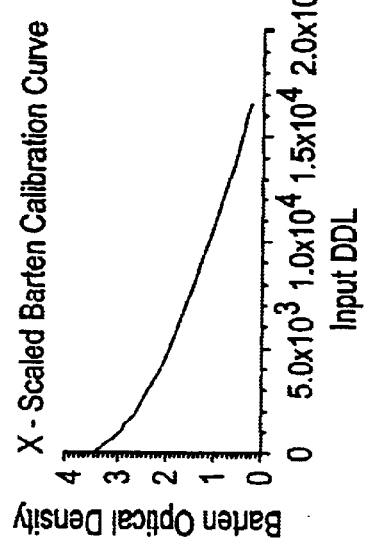
FIG. 8D
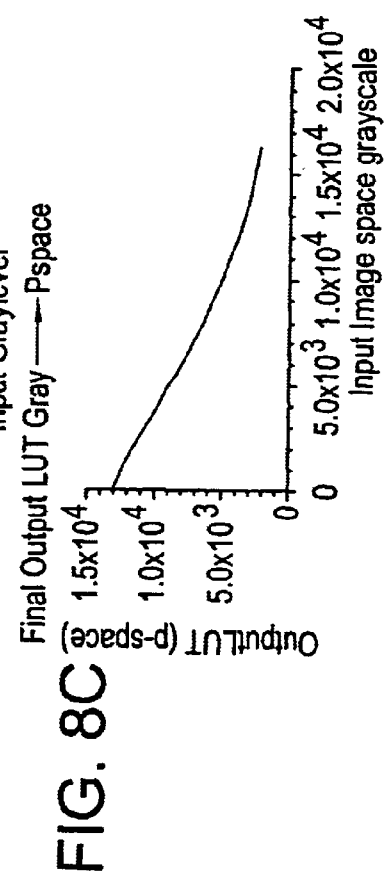
FIG. 8E

METHOD AND APPARATUS FOR CONTROLLING A DYNAMIC RANGE OF A DIGITAL DIAGNOSTIC IMAGE

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention generally relates to medical diagnostic imaging and in particular to a method and apparatus for adjusting the dynamic range of a digital medical image to be presented.

X-ray imaging has long been an accepted medical diagnostic tool. X-ray imaging systems are commonly used to capture, as examples, thoracic, cervical, spinal, cranial and abdominal images that often include the information necessary for a doctor to make an accurate diagnosis. When having a thoracic x-ray image taken, for example, a patient stands with his or her chest against an x-ray sensor as an x-ray technologist positions the x-ray sensor and an x-ray source at an appropriate height. The x-ray sensor then detects the x-ray energy generated by the source and attenuated to various degrees by different parts of the body. An associated control system scans out the detected x-ray energy and prepares a corresponding diagnostic image on a display. Optionally, the x-ray sensor may be a solid state digital image detector. If the x-ray sensor is a conventional screen/film configuration, the screen converts the x-rays to light, to which the film is exposed.

In conventional radiographic imaging systems, the x-ray technique is chosen by the operator. An operator or an automatic exposure control system selects or determines a desired exposure for the selected screen/film configuration in order to obtain a desired optical density of the exposed film. The optical density represents the "lightness" or "darkness" of the resulting film once exposed to x-rays. By controlling the manner (e.g., time, orientation, etc.) of exposure of the detector or screen/film to x-rays, the film lightness or darkness is varied. It is preferable to achieve a consistent optical density from one exposure to the next in order to facilitate diagnosis and examination by physicians when analyzing radiographic images. A screen/film combination system does not have a linear response to x-ray exposure, but instead is non-linear and defined by an x-ray sensitometry curve of the particular screen/film combination. The sensitometry curve relates input exposure to a resulting optical density. The non-linear response of a screen/film combination affords a desirable image contrast at exposure levels falling in the middle of the exposure range. The non-linear response compresses image contrast outside of the middle range. The dynamic range of a screen/film combination system is "fixed". The operator (or via automatic exposure control system) attempts to regulate the transmitted x-ray exposure of the diagnostic regions to fall within the limited middle dynamic range of the screen/film. Different exposures arise from one patient to the next, from one film type to the next, from one medical imaging system to the next, from one orientation to the next and the like.

In the past, it has been quite difficult to maintain a consistent optical density from one exposure to the next (e.g., patient to patient, film to film, system to system, patient angle to patient angle) due to inherent differences. For instance, each patient has a slightly different size and anatomy which causes the internal organs of the patient to have different x-ray attenuation and may be located at different positions relative to the detector or screen/film. For example, when attempting to obtain an x-ray of a chest image, every patient's lungs and rib cage are of a different size. The resulting variance in x-ray attenuation creates a large variance between exposures. Variation in patient position and orientation further create variance between exposures. Variance between exposures may result in the diagnostic exposure range for a particular exposure to fall outside of the detector's "desired" exposure range and compress the diagnostic dynamic range. The resultant optical density may become variable due to particular patient pathology, to foreign objects within a patient (e.g., pacemakers and the like), to differences in patient thickness, as well as to differences in x-ray acquisition parameters (e.g., x-ray energy, dose, exposure time and the like).

automatic exposure control is commonly used with radiographic systems in an attempt to control the exposure range and the resultant optical density of the exposed film. Automatic exposure control systems typically use an x-ray sensitive ion chamber located proximate to the detector or screen/film combination and proximate to the patient. For instance, the operator positions the patient so that his/her lungs are proximate the selected ion chamber for a chest exam. The automatic exposure control terminates the x-ray exposure when a preset dose is measured.

However, automatic exposure control systems have experienced difficulties. In particular, the exact position of an individual patient's lung is unknown while the ion chamber position is fixed. Hence, different patients continue to create a large variance in the resulting exposure to the detector. For instance, the ion chambers may not actually be located proximate certain patient's lungs. When an ion chamber is located proximate an anatomy other than the lung, the automatic exposure control terminates exposure based on inaccurate measurements. A certain percentage of chest films result in creation of either too dark or too light of an image. When the image is too dark or too light, it may be necessary to repeat the x-ray examination to retake the medical image. It is quite time consuming to retake medical images. Film development may require a relatively long period of time, such as five to fifteen minutes, during which the patient may leave the image acquisition area.

Further, a resulting presentation of a medical image is determined by the selection of the type of detector or film/screen configuration in combination with the desired x-ray technique. Different types of detectors and screens/film configurations experience different amounts of image contrast, different signal to noise ratios (SNR) and different dynamic ranges. In the past, SNR has been modified by varying the input exposure. However, to maintain a constant optical density as one varies the exposure level, the detector, film or screen types must be changed to match the expected dynamic range. It is quite cumbersome to change detectors, screens or films, and thus it is rarely done.

More recently, digital detectors have been proposed for use with radiographic imaging. Digital detectors afford a significantly greater dynamic range than convention screen/film configurations, typically as much as two to three times greater. Heretofore, the automatic exposure control and/or operator must still be relied upon to limit the exposure to the digital detector to account for the detectors greater, yet finite, dynamic range. The digitally detected image may be image processed to attain the expected film-like sensitometry curve. That is, the dynamic range is mapped via a contrast look-up table to achieve the desired contrast and optical densities when printed or viewed.

Moreover, with the advent of electronics and digital technology, it has become desirable to offer "soft copies" of medical images to physicians for examination. Soft copies refer to the display of medical images on a television, computer screen and the like after the medical image has been image processed. The soft copy medical images, in many instances, replace a hard copy of the medical image, such as previously provided on exposed x-ray film. Hard copy x-ray films are held up to a back-lit light for examination by the physician. Electronic medical images may be routed more quickly and provide grater viewing flexibility than hard copies for an examining physician.

However, soft copy medical images have experienced certain drawbacks. For instance, the contrast or optical density of medical images when displayed electronically may significantly differ from the contrast or optical density of the medical image. Differences in contrast or optical density may be undesirable to physicians who have grown used to analyzing hard copies. It may also be desirable to maintain consistent contrast or optical density for soft copies and hard copies when physicians alternatively use both. In addition, it may be desirable for physicians to optimize the dynamic range in a subset of region(s) corresponding to particular patient anatomy. A mechanism to preset a limited number of contrast/optical density settings for quick access is needed.

Further, conventional systems using digital detectors have experienced non-ideal compression of the medical image dynamic range. Digital detectors typically store 8 to 16 bit values for each pixel location. Thus, a 14-bit detector offers an approximate dynamic range of 1 to 16,000. However, a subset of the detector's dynamic range may only be used for the actual diagnostic range, namely the dynamic range of the output device, i.e., the monitor or digital film printer which typically support 8, 10, or 12-bit data values.

Conventional digital systems use a fixed dynamic range relation to map all detector pixel values to pixel values of a medical image. Consequently, when a digital image is formed from a detected image, the output medical image contains pixel values limited to a much smaller dynamic range than that of the detector. For instance, an image processed medical image may be limited to 8-bit pixel values, thereby affording a dynamic range of 1 to 256 gray scale values. Hence, the image processing system compresses the dynamic range of the image from a 14-bit value per pixel to an 8-bit value per pixel. Compression of the dynamic range generally results in an uneven optical density. Fixed dynamic range relations in past systems have not corrected for dynamic range compression.

A need remains for an improved dynamic range detection and control method and apparatus for use with digital medical imaging, such as in radiographic imaging.

SUMMARY OF THE INVENTION

A method and apparatus are provided according to the preferred embodiments of the present invention for controlling a dynamic range of a digital medical image for a medical diagnostic imaging system. Initially, a film type is selected along with optical densities for a particular anatomic structure. The system may store characteristics associated with multiple film types and/or multiple anatomical structures. Once a particular film type is selected, maximum and minimum optical densities therefore are obtained from memory. Next, characteristics for an original medical image are obtained representative of the dynamic range of the detected medical image using statistical methods either over the entire image or in subregions of the image. The dynamic range characteristics for the detected image, the selected film characteristics and optical densities for particular anatomic structures are used to form a "sensitometry" model defining a relation between gray levels of the original medical image and target optical densities for a desired output presentation medical image. An inverse of the output device's characteristic curve (gray level display function) is calculated, in order to calibrate gray levels of the presentation image which will be displayed to a user, such as through a printer or monitor. The sensitometery model is combined with the inverse function associated with the characteristic curve or gray level display function to form an auto-contrast map defining a relation between the dynamic range of the original medical image and a target dynamic range for a desired presentation image to be formed from the original medical image. The original medical image is then passed through the auto-contrast map to form a final presentation image that is presented to the user, such as via a printed film on a lightbox or monitor.

The system may utilize digital detectors or film/screen configurations to obtain the original medical image associated with a particular patient.

According to one embodiment, the gray level to optical density model is based upon predefined maximum and minimum optical densities, N selected optical densities associated with particular anatomic structures and measured gray levels obtained from the original medical image which correlate to the selected anatomic structures associated with the N optical densities. These gray levels are transformed to the log-exposure domain using a function which may be calibrated. The gray level to optical density model may represent a sigmoidal or linear curve. Optionally, the gray level to optical density model may correlate dynamic range of the original medical image to a target dynamic range based on user selected and/or measured optical densities for particular anatomic structures. A look-up table may be used to store a sensitometry curve characterizing a relation between gray level and optical density. The look-up table may be used to define the gray level to optical density model which in turn may be used to generate the auto-contrast map.

Optionally, film characteristics for a plurality of film types and/or anatomical regions may be stored, one of which may be selected when an operator chooses a desired film type. The film characteristics may include maximum and minimum optical density characteristics for an associated film type. The auto-contrast map may be stored as a look-up table.

In an alternative embodiment, the gray level to optical density model may be replaced with a localized characteristic curve when a user selects regions of interest in the medical image associated with a particular anatomic structure. The localized characteristic curve defines a relation between a portion of the dynamic range for the original medical image and an expanded target dynamic range for a particular anatomic structure. An auto-contrast map is formed from the localized characteristic curve and inverse output device gray level display function.

BRIEF DESCRIPTION OF THE DRAWINGS

FIGS. 8a–8e illustrate exemplary graphs relating gray level and exposure and optical density to one another in accordance with a preferred embodiment of the present invention.

DETAILED DESCRIPTION OF THE PREFERRED EMBODIMENT

Figure 1:
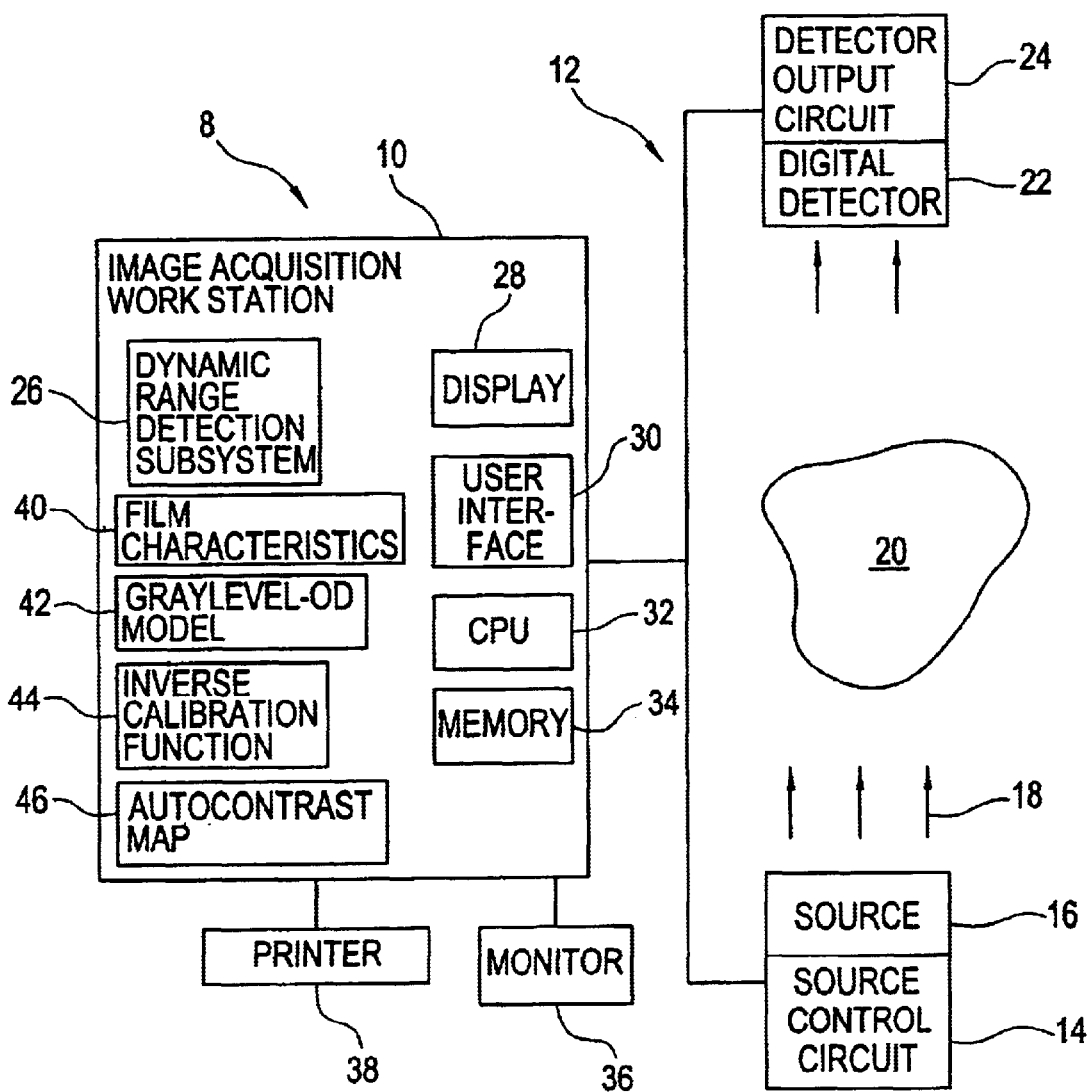
FIG. 1 illustrates a block diagram of a preferred embodiment of the present invention.

FIG. 1 illustrates a medical imaging system configured in accordance with a preferred embodiment of the present invention. The medical imaging system 8 includes an image acquisition workstation 10 and patient examining subsystem 12. The patient examining subsystem 12 includes a source 16 controlled by a control circuit 14. The source 16 emits a medium 18, such as radiation, through a patient 20. A digital detector 22 detects the medium 18 that passes through the patient 20. A detector output circuit 24 converts the information stored by the digital detector 22 to an electronic format processable by the image acquisition workstation 10. The image acquisition workstation 10 accepts an input from the detector output circuit 24 and based thereon passes a raw digital image to a dynamic range detection subsystem 26.

The dynamic range detection subsystem 26 calculates a dynamic range of all or a portion of the digital medical image acquired by the digital detector 22. Alternatively, the dynamic range detection subsystem 26 may calculate the dynamic range of a region of interest or of a particular anatomic structure within a medical image obtained by the digital detector 22. A detailed implementation of at least one dynamic range detection subsystem is described in a co-pending application Ser. No. 09/344,190 filed on or about Jun. 24, 1999, naming Kenneth Kump as the sole inventor and entitled "Method and Apparatus for Determining A Dynamic Range of A Digital Medical Image", assigned to the Assignee of the present application. The dynamic range detection subsystem 26 produces at least one dynamic range characteristic representative of the dynamic range of all or a portion of the digital medical image. The dynamic range characteristics generated by the dynamic range detection subsystem 26 may be, for example, maximum and minimum gray levels for the entire digital medical image, a clinical area, anatomic structure, or region of interest therein. Alternatively, the dynamic range characteristic may represent a mean gray level, median gray level, average gray level, standard deviation of the gray levels and the like for a region such as the entire medical image, an anatomic structure, a clinical area or a region of interest. The region may be automatically selected, user drawn, or selected via some user-controlled interface.

The image acquisition workstation 10 further includes a display 28 and a user interface 30 to present information to an operator and obtain information from an operator, respectively. The image acquisition workstation 10 includes at least one CPU 32 and memory 34 for carrying out the processing sequences set forth below to control the dynamic range of an acquired medical image. The image acquisition workstation 10 may be connected to a remote monitor 36 for displaying processed medical images after dynamic range adjustment. The medical images presented on the monitor 36 represent "soft copies" of a medical image, more commonly printed on film and viewed as a hard copy by physicians on a back lit board. The image acquisition workstation 10 may be connected to a printer 38 such as a digital laser camera which creates a film for analysis when placed on a light box.

The image acquisition workstation 10 includes an input for receiving an original medical image. A presentation map is stored in the image acquisition workstation 10 defining a relation between a dynamic range of the original medical image and a target dynamic range. A CPU in the image acquisition workstation 10 forms a presentation image from the original medical image based on the presentation map stored therein. The input to the image acquisition workstation 10 may be a digital detector. The image acquisition workstation 10 may include a module for calculating a gray level-optical density model defining a relation between gray levels of an original medical image and target optical densities of a target dynamic range for a desired output medical image associated with the original medical image. The model may be based on film characteristics of a desired film type, selected optical densities for a selected anatomical structure, a measured dynamic range for the original medical image and the like. The calculating module may calculate the gray level-optical density model to correlate a dynamic range of the original medical image to a target dynamic range based on user selected optical densities and measured optical densities for an anatomic structure. A look-up table may store sensitometry curves characterize a relation between gray level and optical density. The relation of the presentation map may be based on the stored sensitometry curves in the look-up table. Memory in the image acquisition workstation 10 may store film characteristics for multiple film types. The relation of the presentation map may be based on the stored film characteristics for one of the multiple film types stored in memory. The presentation map may be stored in a look-up table. The presentation map may include an auto contrast map 46 (FIG. 1). The calculating module may include CPU 32 of FIG. 1.

The image acquisition workstation 10 further includes memory for storing sets of film characteristics 40, such as an equation or look-up table defining a predetermined relation between film exposure and optical density. Each set of film characteristics 40 is associated with a particular type of analog film, such as Kodak's Insight line of screen/film combinations: Regular Screen/IT Film, High Contrast Screen/IT Film, Very High Contrast Screen/ITC Film and the like. Separate film characteristics may be stored for films having different speeds, such as 800 speed, 400 speed, 200 speed and the like. The film characteristics need not correspond to commercially available films, but instead may be target, theoretical or hypothetical films. Different types of films exhibit different relations between exposure and optical density. The characteristics of the film may depend upon the manufacturer, the film speed (e.g., 800, 400, 200), film contrast, and film type.

The image acquisition workstation 10 generates a gray level-optical density model 42 in accordance with the preferred embodiment. The model 42 defines a particular relation between gray levels of the digital detector 22 and a desired optical density predefined or defined by the operator. For instance, the operator may chose a particular film type and desired optical densities for particular anatomic structure. An inverse display calibration function 44 is also generated in the image acquisition station 10. The inverse display calibration function 44 defines a relation between gray levels and the optical density or luminance of an output device such as monitor 36 or printer 38. An auto-contrast map 46 is generated by the image acquisition workstation 10 to map original gray levels detected by the digital detector 22 for a region of interest or clinical area onto a target dynamic range containing presentation gray levels which can be sent to a calibrated output device such as monitor 36 or printer 38. The image acquisition workstation 10 passes an acquired medical image through the auto-contrast map 46 and prints or displays, on a calibrated printer or monitor, a medical image affording film simulative results. When examining the patient's chest, the medical image printed or displayed includes a lung field having a predefined desired lung optical density and a mediastinum (spine) having a predetermined desired mediastinum optical density.

The printer 38 may be calibrated in accordance with a Barten calibration function which may be the display calibration function from which the inverse display calibration function 44 is calculated. A Barten calibration function represents a well-known function defined as part of the DICOM standard. A Barten calibration function describes a standard relation between gray levels and luminance which can be translated to optical density.

The image acquisition workstation 10 manages the dynamic range of gray levels for a clinically relevant area or region of interest in a digital medical image obtained by the digital detector 22. The image acquisition workstation 10 accounts for differences in diagnostic ranges for medical images obtained by the digital detector 22. The image acquisition workstation 10 further ensures consistent optical density for medical images printed by printer 38 or displayed by monitor 36 independent of the printer or monitor type. The luminance generated by back-lighting films of controlled optical density generated by the printer 38 will correspond to the luminance of images presented on monitor 36. The image acquisition workstation 10 affords a user the ability to select a desired optical density for particular anatomic structure and/or film type for each application. In addition, the user may select regions of interest corresponding to anatomical regions or manipulate the automatically calculated targets.

Figure 2:
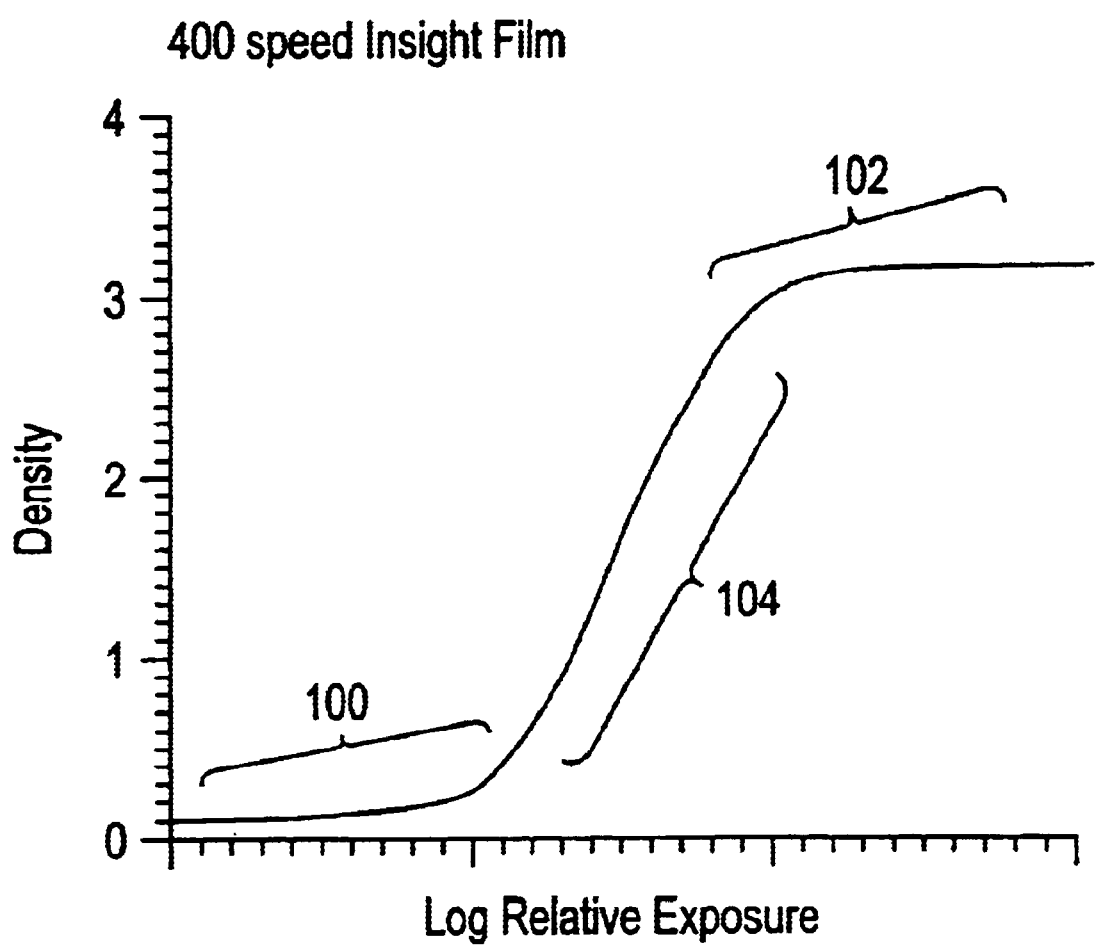
FIG. 2 illustrates an exemplary graph for a particular film type exhibiting a sensitometry curve between film exposure and optical density according to a preferred embodiment of the present invention.

FIG. 2 illustrates a graphical representation of a relation between the exposure and optical density characteristics of an exemplary film. For instance, the film may represent Kodak's VHC Screen/ITC film combination. The graph of FIG. 2 illustrates along the horizontal axis, in a log scale the relative exposure of the film. The vertical axis illustrates the optical density of the film. The exemplary film of FIG. 2 exhibits a sigmoidal relation between relative gray level-optical density having an initial compressed heel portion 100 and compressed trailing toe portion 102. A substantially linear portion 104 is located in the center of the graph.

Figure 3:
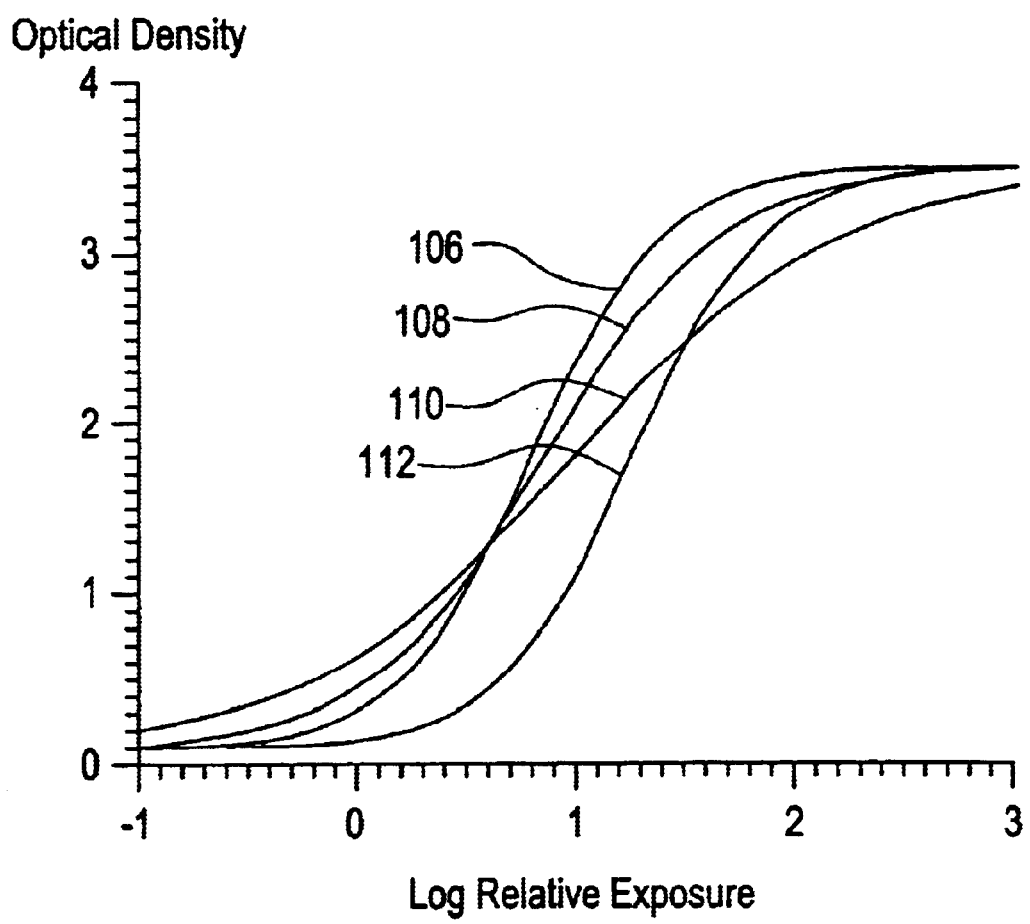
FIG. 3 illustrates multiple sensitometry curves associated with film types having different speeds and contrasts in accordance with a preferred embodiment of the present invention.

FIG. 3 illustrates a set of curves associated with exemplary films of different speeds and contrasts Again, the horizontal axis represents the relative exposure along a log scale, while the vertical axis represents the optical density associated with each exposure. Characteristic curves 106, 108, and 110 correspond to different film contrasts, such as very high contrast, high contrast, and regular. Curve 112 represents a lower speed combination than curves 106, 108 and 110. Optionally, the set of curves denoting exposure to optical density characteristics for particular films may be stored as sets of film characteristics 40 in the image acquisition workstation 10. The characteristic curves 106–112 may be stored as look-up tables to form film characteristics 40. Alternatively, the characteristic curves 106–112 may be stored as equations defining particular curves as film characteristics 40. As a further alternative, only certain points along each curve 106–112 need be stored, such as maximum and minimum points along the curve.

Figure 4:
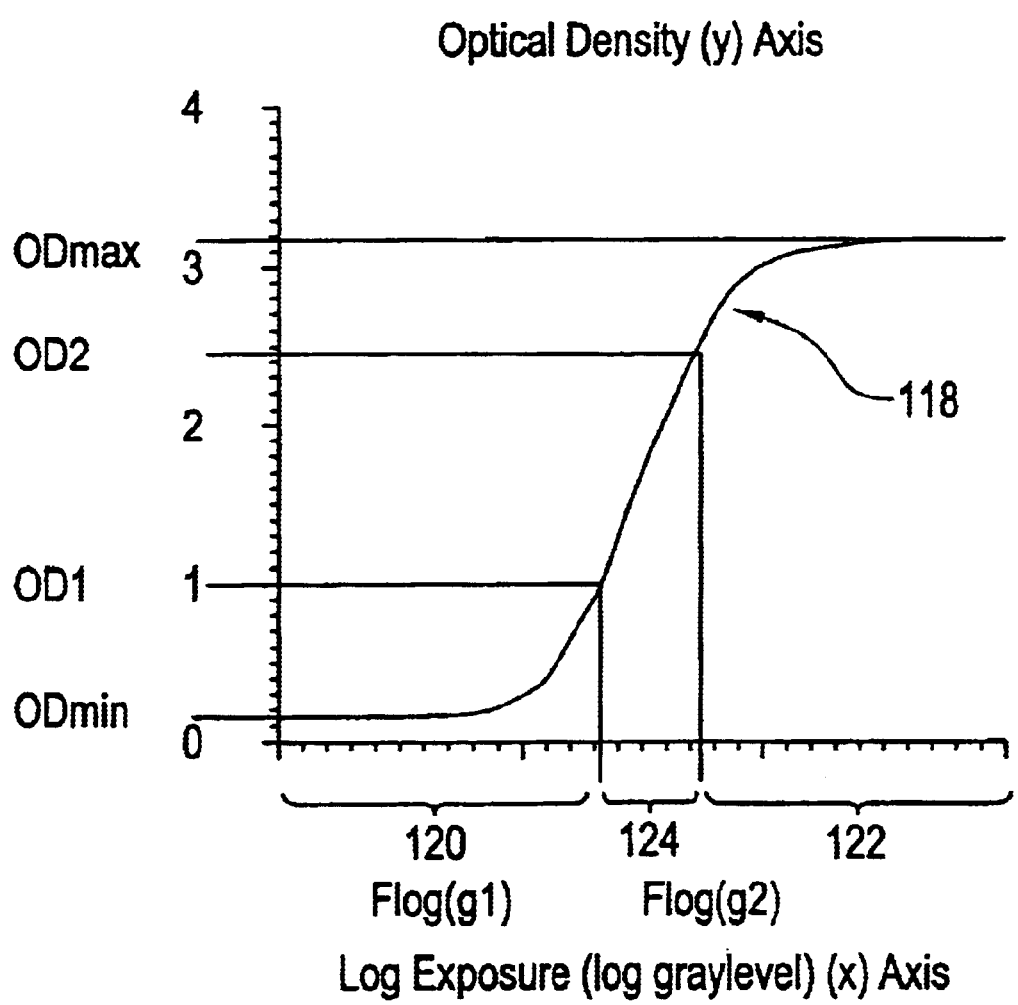
FIG. 4 illustrates an exposure to optical density model defining an exemplary relation between log exposure, or functional_log(gray level) and target optical density in accordance with a preferred embodiment of the present invention.

FIG. 4 illustrates an exposure-optical density function 118 which may be stored as exposure-OD model 42 in the image acquisition workstation 10. The exposure-optical density function 118 may represent a film-like model defining a relation between gray levels of the medical image obtained by the digital detector 22 and target optical densities defined by a physician or operator or preset based on historic data or user preferences. A digital detector, in general, has a non-linear response to the incident exposure. Thus, the transform from gray level to log exposure space is performed via a functional-log (flog). This function can be calibrated or specified. The exposure/optical density function of FIG. 4 illustrates along the horizontal axis the log exposure or flog(gray levels) of an original acquired medical image detected by digital detector 22. The vertical axis corresponds to optical densities desired by the operator or preset based on user preferences. FIG. 4 illustrates a sigmoidal function having an initial heel portion 120 and a trailing toe portion 122. The heel and toe portions 120 and 122 are separated by a somewhat linear portion 124. In the exemplary function illustrated in FIG. 4, the optical densities (OD) along the vertical axis are defined according to the following equation:

$$OD = p2 + p3 * \frac{1 - \exp(-(\log E + p1)/p0)}{1 + \exp(-(\log E + P1)/p0)} \quad \text{[Equation 1]}$$

In Equation 1, log E refers to the log-base 10 of the exposure.

According to Equation 1, the optical density is a function of the log base 10 value of the exposure or flog(gray level) of a particular pixel in the digital detector 22. The optical density is also a function of variables p0, p1, p2 and p3 where p0–p3 are solved using the following equations:

$$p2 = 0.5*(\text{Max}OD + \text{Min}OD) \quad \text{[Equation 2]}$$

$$p3 = 0.5*(\text{Max}OD - \text{Min}OD) \quad \text{[Equation 3]}$$

$$\begin{bmatrix} p0 \\ p1 \end{bmatrix} = (C^T C)^{-1} C^T Lg \text{ where} \quad \text{[Equation 4]}$$

-continued $$C = \begin{bmatrix} c1 & 1 \\ \vdots & \vdots \\ cN & 1 \end{bmatrix}, \quad ci = \ln\left(\frac{2*p3}{ODi - p2 + p3} - 1\right), \text{ and}$$ [Equation 5]

$$Lg = \begin{bmatrix} flog(g1) \\ \vdots \\ flog(gN) \end{bmatrix}.$$

N pairs of measured data, [gi, ODi], i=1, ..., N, are used to estimate parameters, p0 and p1, where the overall mean square of the fitting error is minimized. If two pairs of [g1, OD1] and [g2, OD2] are used (N=2), [Equation 4] can be simplified as $$p0 = \frac{flog(g1) - flog(g2)}{c2 - c1}$$ [Equation 6]

$$p1 = \frac{c1 * flog(g2) - c2 * flog(g1)}{c2 - c1} = -c1 * p0 - flog(g1)$$ [Equation 7]

The values MaxOD and MinOD correspond to film maximum and minimum optical density values that are predetermined. The function flog( ) converts gray level to log exposure and may be fixed or calibrated. The values MaxOD and MinOD may be stored as film characteristics 40 or based thereon. The values MaxOD and MinOD are based upon the desired type of film to be used. The maximum and minimum optical densities for a chosen film may be obtained from a data sheet provided by the manufacturer of the film setting forth the particular films operating characteristics including the maximum and minimum values for the film optical density.

The values OD1 and OD2 correspond to first and second anatomic optical densities that are selected by the operator or are predefined. By way of example, the anatomic optical densities OD1 and OD2 may correspond to particular anatomical structures, such as the lungs and spine to be viewed in a give type of examination. A physician may desire, when viewing a chest x-ray, that the lungs within a resultant presented image have a particular optical density, such as 2.5. The physician may further desire that the spine within the resultant presented image have a different particular optical density, such as 0.7. Thus, the first and second anatomic optical densities OD1 and OD2 may be selected for the lungs and spine. Alternatively, OD1 and OD2 may correspond to different anatomic structures, such as bone, soft tissue and the like. Alternatively, the physician need not select the optical densities OD1 and OD2. Instead, OD1 and OD2 may be predefined in the system and stored in memory 34 based on historic information and/or preferences of past physicians and operators.

The gray level values g1 and g2 correspond to measured gray scale values provided by the dynamic range detection system 26 as explained in detail in the above-referenced co-pending application. By way of example, measured gray levels g1 and g2 may represent maximum and minimum gray levels for the clinical area or region of interest from the medical image obtained by the digital detector 22. The function flog, transforms the gray levels to log exposure. In one implementation, the detector may be linear to exposure and the function may be a straight forward log-base 10. As explained below, once the MaxOD, MinOD, OD1, OD2 and g1 and g2 are determined by the image acquisition workstation 10, the gray level-OD model 42 may be defined in accordance with Equations 1–7 for a particular original medical image obtained by digital detector 22.

Figure 7B:
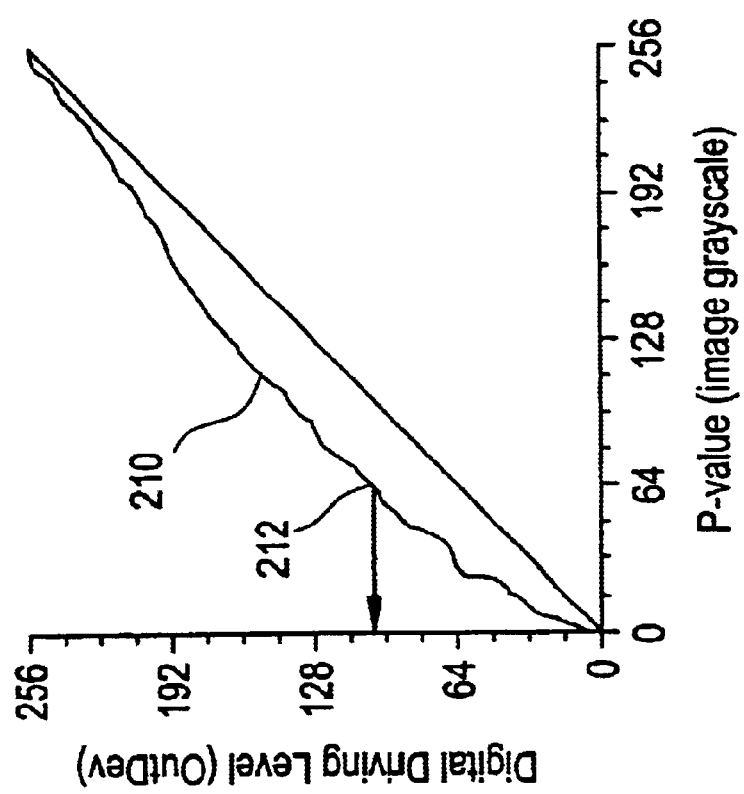
FIG. 7B illustrates a gray level display function correlating input gray levels and output calibrated gray levels for an exemplary output device.
Figure 7A:
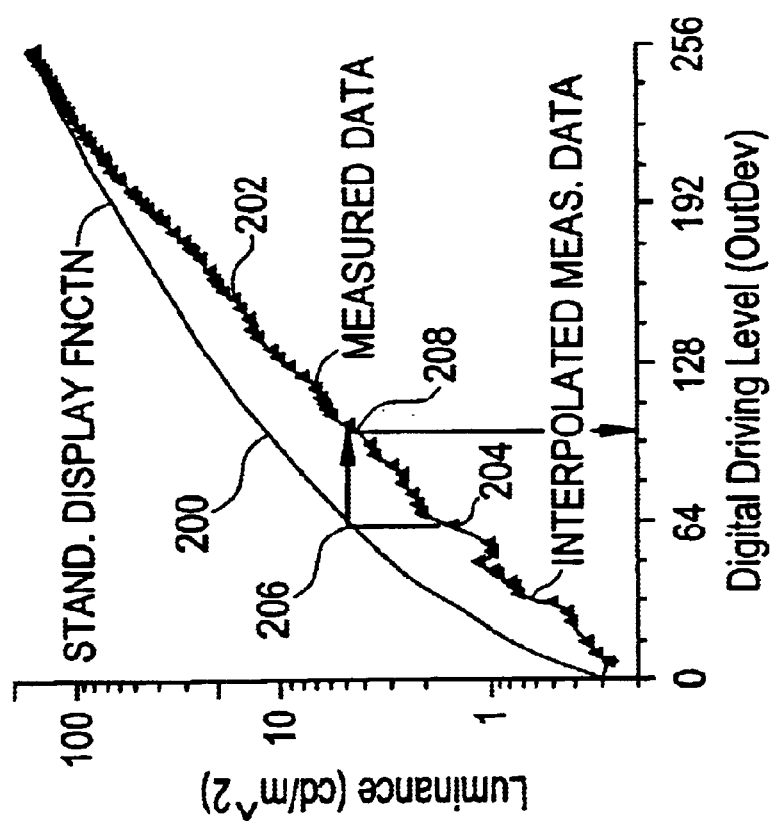
FIG. 7A illustrates measured and ideal curves relating input gray levels to output luminance of ideal and actual exemplary output devices.

FIGS. 7A and 7B illustrate an exemplary gray scale standard display function and implementation thereof. FIG. 7A denotes along the horizontal axis the gray level digital values of an output device, such as between zero and 256. The vertical axis in FIG. 7A denotes a level of luminance produced at a particular pixel when the output device receives a corresponding gray level digital value between zero and 256. Graph 200 denotes a universal accepted "standard" to which display devices should perform, (e.g., a device should output a luminance in accordance with graph 200 when receiving a bit value of 0–256). Graph 202 denotes a sequence of luminance values measured while calibrating an exemplary output device. Output devices, such as printers and monitors, do not provide a constant, predetermined luminance over the device life as age, wear and the like affect device performance. Hence, devices should be calibrated to correlate luminance and input gray levels. The measured data points along curve 202 illustrate a luminance produced by the output device, when uncalibrated, in response to receiving a particular gray level. For instance, when the output device receives a gray level of 64, the output device generates a pixel having a luminance of approximately 1.6 (point 204). However, if the device operates ideally and without error, it is expected to generate a pixel having a luminance of approximately 4.0 (point 206) when receiving a gray level input of 64.

The standard display function is used to calibrate the output device by calculating for each input gray level, a calibrated or corrected gray level that will produce the desired luminance value. In the example of FIG. 7A, when a gray level 64 is input to the uncalibrated device, the standard display function identifies the desired luminance (point 206) and a corrected gray level (point 208) that, when input to the output device, will produce the desired luminance. In the example of FIG. 7A, the calibrated gray level at point 208 corresponds to approximately 98. The correction process illustrated in FIG. 7A between points 204–208 is repeated for every pixel value to form a calibration curve 210 that may represent a gray scale standard display function, such as illustrated in FIG. 7B.

FIG. 7B illustrates along the horizontal axis gray levels between zero and 256 associated with an input medical image. The vertical axis illustrates gray levels of a calibrated output device. Calibration curve 210 defines a relation between each gray level of the input image and a corrected gray level that must be provided to the output device in order to obtain the desired luminance. In the example of FIGS. 7A and 7B, the gray level 64 from the original input image was determined in FIG. 7A to correspond to a calibrated pixel value of 98. Accordingly, the calibration curve 210 includes a point 212 associating the gray level 64 from the original image with the gray level 98 to be supplied to the output device.

Figure 5:
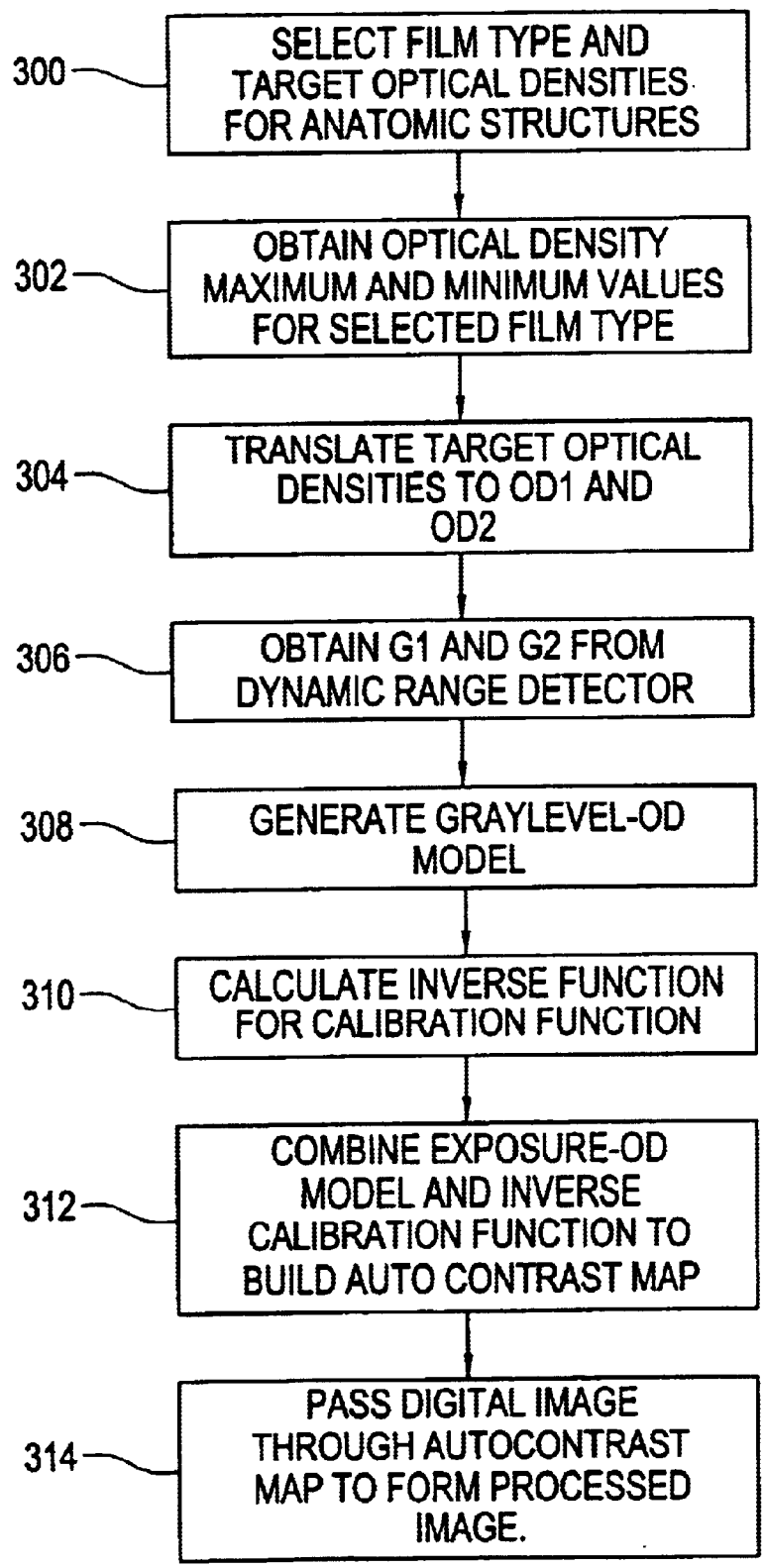
FIG. 5 illustrates a processing sequence carried out in accordance with a preferred embodiment of the present invention.

FIG. 5 illustrates a processing sequencing carried out in accordance with a preferred embodiment of the present invention. Beginning at step 300, the user selects a film type and target optical densities for particular anatomic structures. The film type selected may be a physician's preferred or a commonly used type of film. The target optical densities may be determined automatically from stored values based on particular areas of interest, such as the lungs and spine. Optionally, the target optical densities may be predefined and stored in memory 34 for the operator to later select during use. Once the operator selects a film type, at step 302, the CPU 32 obtains minimum and maximum optical density values for the selected film. The minimum and maximum optical densities are obtained from the film characteristics 40 stored in the image acquisition workstation 10.

At step 304, the target optical densities are translated into first and second optical densities OD1 and OD2. The optical densities OD1 and OD2 may correspond to upper and lower dynamic range limits for an area of interest which coincides with an anatomic structure of interest. For instance, lungs and the spine may have optical densities at opposite ends of a target dynamic range for an area of interest. The translation at step 304 may simply correspond to obtaining OD1 and OD2 values from memory based upon a mode of the system or a selection made by an operator via the user interface 30. Next, at step 306, the CPU 32 obtains from the dynamic range detection subsystem 26 measured gray levels g1 and g2 representative of the dynamic range for the medical image obtained at digital detector 22. The measured gray levels g1 and g2 may correspond to minimum and maximum gray levels for a clinical area of the medical image. The measured gray levels g1 and g2 may correspond to OD1 and OD2. Alternatively, the gray levels g1 and g2 may merely correspond to the minimum and maximum gray levels of the entire medical image obtained by digital detector 22 which may be less than the full dynamic range of the digital detector 22. The gray levels g1 and g2, when corresponding to a dynamic range of a clinical area, may represent the gray levels associated with lungs and the mediastinum or spine, respectively. Alternatively, gray levels g1 and g2 may correspond to other anatomic structures such as bone, soft tissue and the like. The dynamic range detection subsystem 26 may obtain gray levels g1 and g2 associated with different anatomic structures based upon the particular test to be performed or operator's preference.

At step 308, the CPU 32 generates gray level-OD model 42 based on the measured gray levels g1 and g2, target optical densities OD1 and OD2, and optical density maximum and minimum values MaxOD and MinOD obtained in steps 306, 304 an 302, respectively. The gray level-OD model 42 is calculated in accordance with equations 1–7 noted above. The gray level-OD model 42 may resemble the sigmoidal function illustrated in FIG. 4. Optionally, the gray level-OD model 42 need not necessarily define a sigmoidal relation between exposure/gray levels and optical densities. Instead, the gray level-OD model 42 may correspond to a linear relation between gray level and optical density.

At step 310, the CPU 32 calculates the inverse of the standard display function, such as the inverse of calibration curve 210 in FIG. 7B. For instance, if the medical image is to be printed by a digital laser camera, a calibration function such as the "Barten calibration function" may be obtained and used to calculate its inverse. The standard display function (FIGS. 7A and 7B) maps gray level values to luminance (e.g., optical densities). The inverse calibration function 44 is calculated at step 310 in order to map optical densities to gray levels. At step 312, the CPU 32 combines the gray level-optical density model 42 and inverse calibration function 44 to build an auto-contrast map 46. The gray level-OD model 42 maps gray levels of the original medical image to target optical densities. The inverse calibration function 44 maps the target optical densities to calibrated gray level inputs for an output device.

By combining the gray level-OD model 42 and inverse calibration function 44, the image acquisition work station 10 defines a relation between the gray levels in the original medical image obtained by the digital detector 22 and calibrated gray level inputs associated with a selected output device, namely printer 38, monitor 36 and the like. The auto-contrast map 46 may be stored as a look-up table, a polynomial equation and the like. Finally, at step 314, the digital medical image obtained by the digital detector 22 is passed through the auto-contrast map 46 to form a calibrated image, having a dynamic range adjusted based on an operators preferences and that is presented at display 28, printer 38 or monitor 36.

Figure 6:
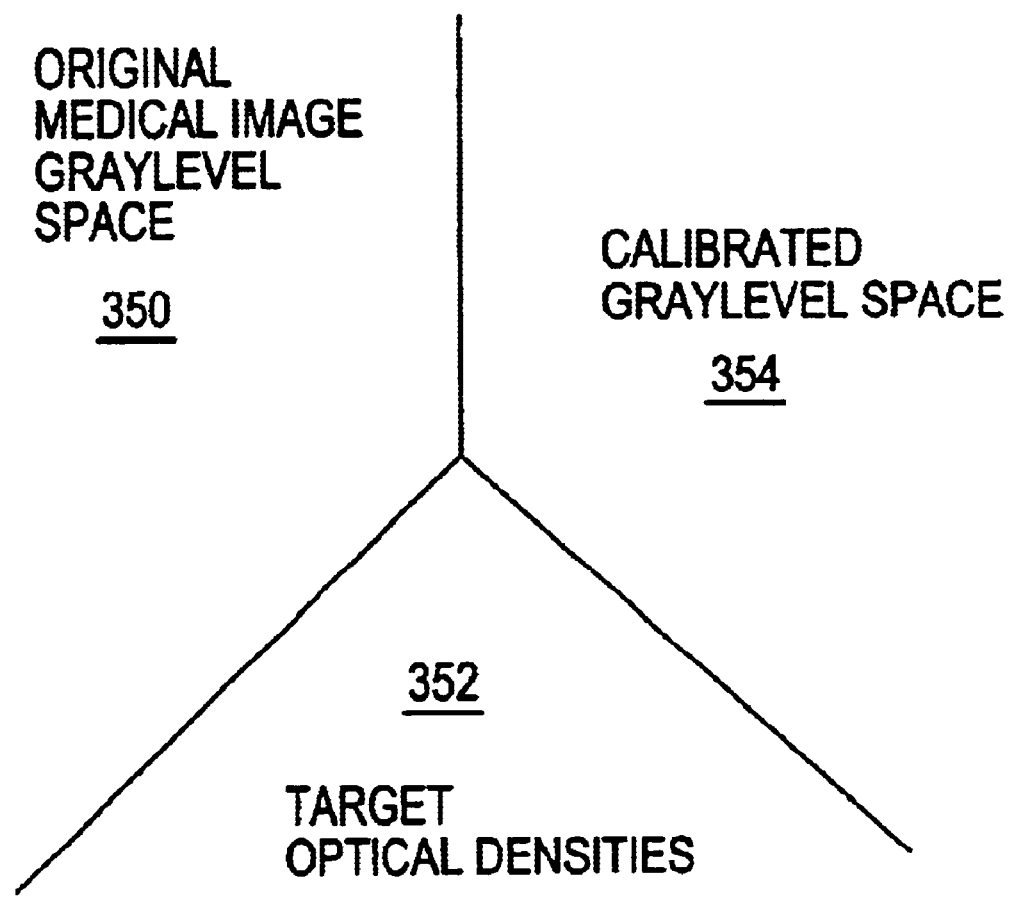
FIG. 6 illustrates a conceptual map relating gray level space to optical density space in accordance with a preferred embodiment of the present invention.

FIG. 6 is intended to further illustrate the transformations between gray level space and optical density space carried out in accordance with the process of FIG. 5. A raw image gray level space 350 is illustrated correspond to the original medical image obtained by the digital detector 22 stored as a two-dimensional array of pixel values. By way of example, the pixel values may be 14-bit values affording a dynamic range for the digital detector of 0–16K. The digital medical image does not include exposures or gray levels spanning the entire 16K dynamic range of the digital detector. Instead, the digital medical image may only include a few thousand distinct gray levels representing a smaller dynamic range than the 16K range of the digital detector 22. The dynamic range detection subsystem 26 measures a desired dynamic range. A target optical density space 352 corresponds to target optical densities or luminance associated with an output medium desired to present the digital medical image to the physician or operator. A calibrated gray level space 354 corresponds to an image having gray levels that have been corrected to achieve desired luminance values from an output device.

During processing, the image acquisition workstation 10 calculates a gray level-optical density model 42 that is used to convert the original digital medical image from gray level space 350 to a target optical density space 352. The target optical density space 352 corresponds to the optical density values defined by the operator when selecting a desired type of film and optical densities for particular anatomic structures. For instance, the digital medical image in gray level space 350 may be mapped to the target optical density space 352 in accordance with the relation set forth in FIG. 4.

Next, the image corrected for target optical densities is calibrated in accordance with a desired output medium (e.g., printer or monitor). The target optical density image is calibrated by passing the target optical density image in optical density space 352 through an inverse calibration function 44 to form a calibrated image in calibrated gray level space 354.

Alternatively, the exposure-OD model 42, inverse calibration function 44 and calibration function may be combined into a single map defining a relation between original image gray level space 350 and calibrated gray level space 354 associated with a desired output medium such as printer 38 or monitor 36. The resultant map may be stored as an auto-contrast map 46. Once the auto-contrast map 46 is calculated, the CPU 32 may pass the original medical image obtained by digital detector 22 from gray level space 350 through the auto-contrast map 46 directly to calibrated gray level space 354.

FIGS. 8a–8e illustrate exemplary graphs that may be utilized by the image acquisition workstation 10 to carry out the processing sequence described above in connection with FIG. 5. FIG. 8a illustrates a characteristic curve associated with a particular type of film defined by a logarithmic relation between exposure and optical density. FIG. 8d illustrates the characteristic curve of the same film as in FIG. 8a, but illustrated on a linear scale of exposure versus optical density. FIG. 8b illustrates a characteristic curve of an analog film to be matched once the analog film has been scaled in accordance with the exposure-OD model 42. The characteristic curve of FIG. 8b illustrates a relation between input gray levels and film optical density. FIG. 8e illustrates a scaled Barten calibration curve defining a relation between an input gray level and the optical density of a digital laser camera calibrated in accordance with the Barten calibration standard. FIG. 8c illustrates an auto-contrast map 46 defining a relation between gray levels of an original medical image obtained by digital detector 22 and optical density values associated with a particular output medium such as a printer.

Figure 9:
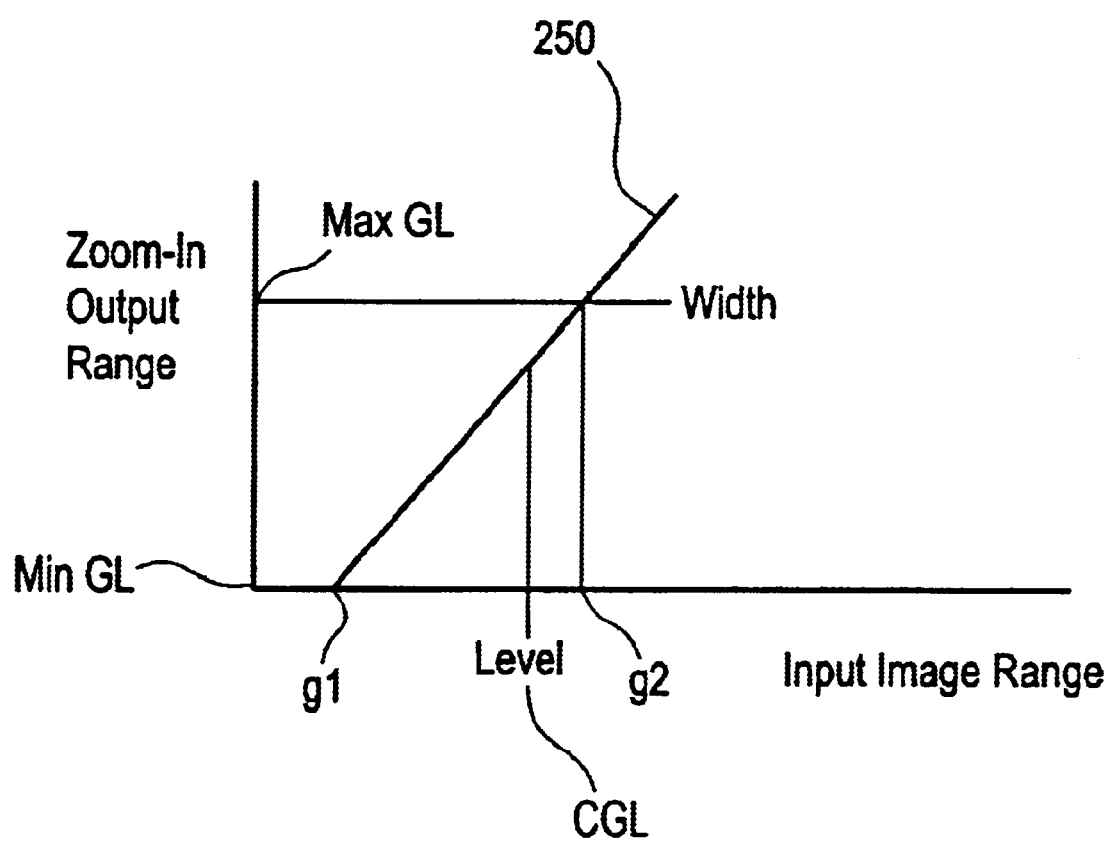
FIG. 9 illustrates a localized characteristic curve defining a relation between input and output dynamic ranges utilized in accordance with an alternative embodiment of the present invention.

FIG. 9 denotes operation of an alternative embodiment according to the present invention. In the alternative embodiment represented by FIG. 9, the gray level-OD model 42 may be omitted, such as when it is desirable to focus upon or localize upon a particular region of interest having a gray level dynamic range smaller than the full range afforded a normal digital medical image. For instance, an operator may initially view a digital medical image upon display 28 and select a region of interest therefrom via user interface 30. For instance, the user may use a mouse, light pen or keypad to select the corners surrounding a region of interest or to draw around a region of interest. Once the region of interest is chosen, the dynamic range detection subsystem 26 identifies the dynamic range of the region of interest. The region of interest may have a dynamic range somewhat smaller than the full dynamic range capable of being presented on display 28, monitor 36 or printer 38. In the embodiment graphically illustrated in FIG. 9, the image acquisition workstation 10 expands or blows up the dynamic range of the region of interest to afford better contrast between gray levels within the region of interest.

FIG. 9 illustrates a "localized" curve 250 representing a predefined relation between a dynamic range of an input image (horizontal axis) and a blown-up or expanded dynamic range of an output image (vertical axis). The localized curve 250 may be stored in place of the gray level-OD model 42. The localized curve 250 may be linear or non-linear, and be defined by one or more characteristics.

Optionally, multiple sets of localized characteristics may be stored, such as in place of film characteristics 40. Each set of localized characteristics may correspond to a particular anatomy, such as the lungs, bone, soft tissue, or an overall anatomic structure, and the like. The sets of localized characteristics for each anatomic structure may include a parameter defining the center of a dynamic range window associated with the particular anatomic structure. Each localized characteristic set may further include a dynamic range window width defining the upper and lower limits of the dynamic range associated with a corresponding structure. For instance, the characteristic set for a lung setting may include a dynamic range window center gray level of 10,000 and a dynamic range window width of 4,000. Thus, the exemplary dynamic range for a lung would be between 8,000 and 12,000. Similarly, a set of localized characteristics for a bone setting may have a predefined center gray level and width for the corresponding dynamic range window.

In the example of FIG. 9, the upper and lower limits for the dynamic range window correspond to MinGL and MaxGL which represent minimum and maximum gray levels for a dynamic range window associated with a particular anatomic structure. Gray levels MiniGL and MaxGL may be stored as characteristics 40. In accordance with the embodiment of FIG. 9, the dynamic range detection subsystem 26 provides gray levels g1 and g2 identifying the dynamic range of an anatomic structure, clinical region or region of interest in the original medical image. In accordance with the embodiment of FIG. 9, the image acquisition workstation 10 defines a localized characteristic curve 250 based on the gray levels g1 and g2 provided from the dynamic range detection subsystem 26 and based on the minimum and maximum gray levels MinGL and MaxGL stored as characteristic sets 40. In addition, a center gray level parameter for a desired dynamic range may be stored with characteristics 40 and used as level CGL (center gray level) in order to facilitate generation of the curve 250.

Once the image acquisition workstation 10 defines the localized characteristic curve 250, the curve 250 is stored in place of the gray level-OD model 42 and combined in accordance with the process of FIG. 5 with the inverse calibration function 44 to define an auto-contrast map 46 ultimately mapping gray levels of the original medical image onto a calibrated gray level space 354 (FIG. 6). The localized characteristic curve 250 illustrated in FIG. 9 maps input gray level space onto an output gray level space. Hence, it is understood that the inverse calibration function 44 is modified to correctly form the desired auto-contrast map 46.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications as incorporate those features which come within the spirit and scope of the invention.

What is claimed is:

1. A method for controlling a dynamic range of a medical diagnostic image provided by a medical diagnostic system comprising:

identifying a target dynamic range independent of a dynamic range of an original medical image;

generating a presentation map defining a relation between said dynamic range of said original medical image representative of a patient and said target dynamic range; and creating a presentation image having said target dynamic range based on said presentation map and original medical image.

2. The method of claim 1, further comprising:

obtaining a digital image as the original medical image.

3. The method of claim 1, further comprising:

calculating a gray level-optical density model defining a relation between gray levels of the original medical image and target optical densities of said target dynamic range for a desired output medical image associated with the original medical image, said generating step defining said relation of said presentation map based on said gray level-optical density model.

4. The method of claim 3, further comprising basing said gray level-optical density model on film characteristics for a desired film type.

5. The method of claim 3, further comprising basing said gray level-optical density model on N selected optical densities for a selected anatomical structure.

6. The method of claim 3, further comprising basing said gray level-optical density model on a measured dynamic range for the original medical image.

7. The method of claim 1, further comprising:

calculating a model correlating said dynamic range of said original medical image to said target dynamic range based on user-selected optical densities and measured optical densities for an anatomic structure.

8. The method of claim 1, further comprising:

defining a look-up table storing a sensitometry curve characterizing a relation between gray level and optical density, said generating step defining said relation of said presentation map based on said look-up table.

9. The method of claim 1, further comprising:

storing film characteristics for multiple film types, said generating step defining said relation of said presentation map based on stored film characteristics for one of said multiple film types.

10. The method of claim 1, further comprising:

obtaining maximum and minimum optical density characteristics for one film type, said generating step defining said relation of said presentation map based on said maximum and minimum optical density characteristics.

11. The method of claim 1, further comprising:

obtaining an output device calibration function calibrating gray levels of said presentation image for an output device, said generating step defining said relation of said presentation map based on said output device calibration function.

12. The method of claim 1, further comprising:

defining a gray level standard display function based on levels of luminance produced by an output device, said levels of luminance corresponding to gray level digital values; and calculating an inverse of said gray level standard display function, said generating step defining said relation of said presentation map based on said inverse of said gray level display function.

13. The method of claim 1, wherein said presentation map is stored as a look-up table.

14. A medical diagnostic system for controlling a dynamic range of a medical diagnostic image, comprising:

a first input for receiving an original medical image;

a second input for receiving a target dynamic range independent of a dynamic range of said original medical image;

a presentation map defining a relation between a dynamic range of said original medical image and said target dynamic range; and a CPU forming a presentation image from the original medical image based on said presentation map.

15. The system of claim 14, wherein said input is a digital detector.

16. The system of claim 14, further comprising:

a module for calculating an gray level-optical density model defining a relation between gray levels of the original medical image and target optical densities of said target dynamic range for a desired output medical image associated with the original medical image.

17. The system of claim 16, wherein said gray level-optical density model is based on film characteristics of a desired film type.

18. The system of claim 16, wherein said gray level-optical density model is based on N selected optical densities for a selected anatomical structure.

19. The system of claim 16, wherein said gray level-optical density model is based on a measured dynamic range for the original medical image.

20. The system of claim 14, further comprising:

a module calculating a model correlating said dynamic range of said original medical image to said target dynamic range based on user-selected optical densities and measured optical densities for an anatomic structure.

21. The system of claim 14, further comprising:

a look-up table storing a sensitometry curve characterizing a relation between gray level and optical density, said relation of said presentation map being based on said look-up table.

22. The system of claim 14, further comprising:

memory storing film characteristics for multiple film types, said relation of said presentation map being based on stored film characteristics for one of said multiple film types.

23. The system of claim 14, further comprising:

an input for obtaining maximum and minimum optical density characteristics for one film type, said relation of said presentation map being based on said maximum and minimum optical density characteristics.

24. The system of claim 14, wherein said CPU obtains a gray level standard display function calibrating gray levels of said presentation image for an output device, said relation of said presentation map being based on said gray level standard display function.

25. The system of claim 24, wherein said CPU calculates an inverse of said gray level standard display function, said relation of said presentation map being based on said inverse of said gray level standard display function.

26. The system of claim 24, wherein said presentation map is stored in a look-up table.

* * * * *